(12) United States Patent
Nakanishi et al.

(10) Patent No.: US 8,327,068 B2
(45) Date of Patent: Dec. 4, 2012

(54) MEMORY MODULE, MEMORY CONTROLLER, NONVOLATILE STORAGE, NONVOLATILE STORAGE SYSTEM, AND MEMORY READ/WRITE METHOD

(75) Inventors: Masahiro Nakanishi, Kyoto (JP); Tomoaki Izumi, Osaka (JP); Tetsushi Kasahara, Osaka (JP); Kazuaki Tamura, Osaka (JP); Kiminori Matsuno, Osaka (JP); Manabu Inoue, Osaka (JP); Masayuki Toyama, Osaka (JP); Kunihiro Maki, Osaka (JP)

(73) Assignee: Panasonic Corporation, Osaka (JP)

( * ) Notice: Subject to any disclaimer, the term of this patent is extended or adjusted under 35 U.S.C. 154(b) by 1107 days.

(21) Appl. No.: 11/817,532

(22) PCT Filed: Mar. 1, 2006

(86) PCT No.: PCT/JP2006/303899
§ 371 (c)(1),
(2), (4) Date: Dec. 5, 2007

(87) PCT Pub. No.: WO2006/093201
PCT Pub. Date: Sep. 8, 2006

(65) Prior Publication Data
US 2008/0307152 A1    Dec. 11, 2008

(30) Foreign Application Priority Data
Mar. 3, 2005    (JP) .................................. 2005-058462

(51) Int. Cl.
*G06F 12/00* (2006.01)
(52) U.S. Cl. .......... 711/104; 711/E12.083; 711/E12.007
(58) Field of Classification Search ........................ None
See application file for complete search history.

(56) References Cited

U.S. PATENT DOCUMENTS

| | | | | | |
|---|---|---|---|---|---|
| 4,263,664 | A | * | 4/1981 | Owen et al. | 365/185.08 |
| 4,523,295 | A | * | 6/1985 | Zato | 714/22 |
| 5,023,813 | A | * | 6/1991 | Brown, III | 358/1.17 |
| 5,161,311 | A | * | 11/1992 | Esmer et al. | 33/356 |
| 5,175,842 | A | * | 12/1992 | Totani | 711/161 |
| 5,517,470 | A | * | 5/1996 | Zanders et al. | 365/185.28 |
| 5,740,396 | A | * | 4/1998 | Mason | 711/103 |
| 5,862,083 | A | * | 1/1999 | Tobita et al. | 365/185.09 |

(Continued)

FOREIGN PATENT DOCUMENTS
JP            6-4410        1/1994
(Continued)

OTHER PUBLICATIONS

Ali Sheikholeslami, "FeRAM Tutorial:", Jul. 19, 2000, http://www.eecg.toronto.edu/~ali/ferro/tutorial.html.*

(Continued)

*Primary Examiner* — Edward Dudek, Jr.
*Assistant Examiner* — Christopher Birkhimer
(74) *Attorney, Agent, or Firm* — Greenblum & Bernstein, P.L.C.

(57) ABSTRACT

In a storage having a nonvolatile RAM of destructive read type, the number of restorations attributed to data read from the nonvolatile RAM is decreased, and the overall life of the storage is prolonged. In a storage having a nonvolatile RAM of destructive read type and a volatile RAM and holding the same data in the nonvolatile and volatile RAMs, data is read out of the volatile RAM in reading and data is written in both volatile and nonvolatile RAMs in writing.

14 Claims, 8 Drawing Sheets

U.S. PATENT DOCUMENTS

| | | | |
|---|---|---|---|
| 6,421,279 B1 * | 7/2002 | Tobita et al. | 365/189.011 |
| 6,532,538 B1 * | 3/2003 | Cronk et al. | 713/2 |
| 6,990,603 B2 * | 1/2006 | Strasser | 714/6.2 |
| 2002/0129191 A1 * | 9/2002 | DaCosta | 711/103 |
| 2002/0188801 A1 * | 12/2002 | Green | 711/113 |
| 2003/0172320 A1 * | 9/2003 | Mehta et al. | 714/31 |
| 2004/0198479 A1 * | 10/2004 | Martinek et al. | 463/1 |
| 2006/0015683 A1 * | 1/2006 | Ashmore et al. | 711/113 |
| 2007/0186040 A1 | 8/2007 | Kasahara et al. | |

FOREIGN PATENT DOCUMENTS

| | | |
|---|---|---|
| JP | 7-219720 | 8/1995 |
| JP | 08065625 A * | 3/1996 |
| JP | 10-307749 | 11/1998 |
| JP | 2001-142774 | 5/2001 |
| JP | 2004-326523 | 11/2004 |

OTHER PUBLICATIONS

Jim Handy, "The Cache Memory Book: The Authoritative Reference on Cache Design", Second Edition, 1998, pp. 8-9, 34-35, 56-59, 64-67, and 224-225.*
English Language Abstract of JP 6-4410.
English Language Abstract of JP 10-307749.
English Language Abstract of JP 2004-326523.
English Language Abstract of JP 2001-142774.
English Language Abstract of JP 7-219720.
U.S. Appl. No. 11/722,362 to Nakanishi et al., filed Jun. 21, 2007.
U.S. Appl. No. 11/908,715 to Nakanishi et al., filed Sep. 14, 2007.

* cited by examiner

F I G. 2
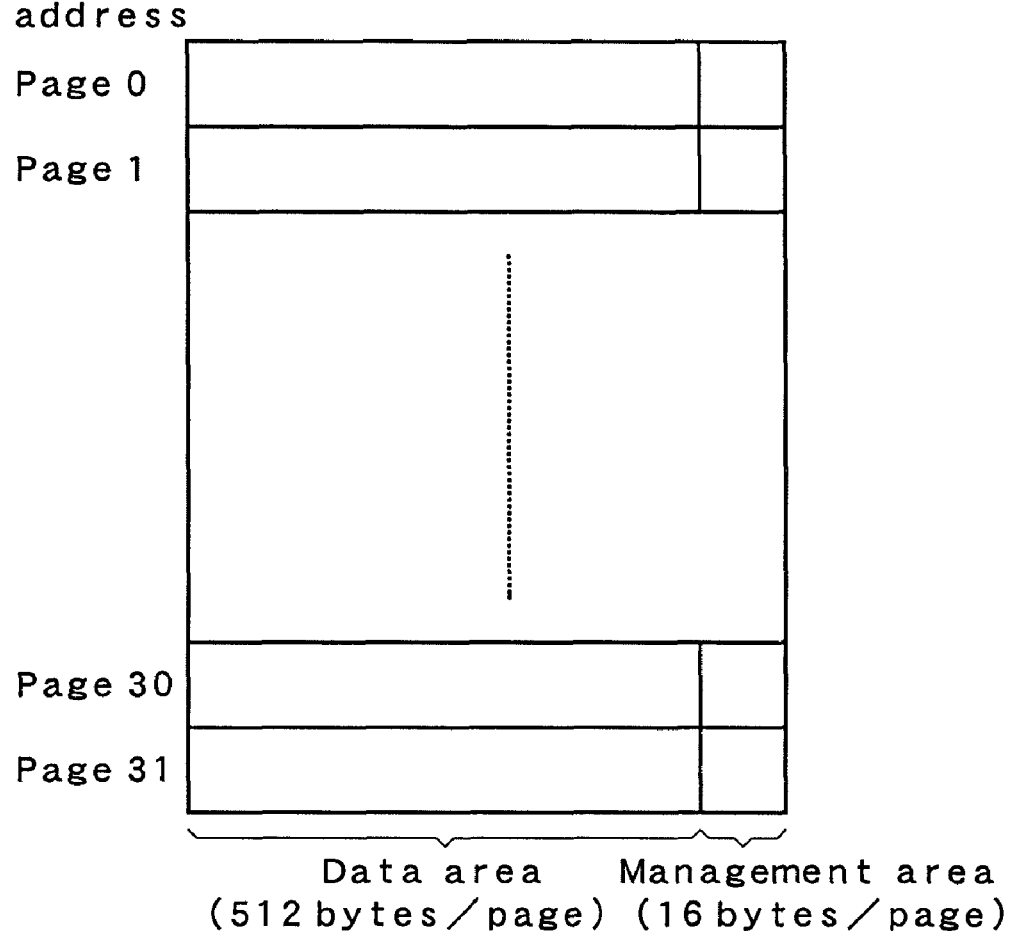

MEMORY MODULE, MEMORY CONTROLLER, NONVOLATILE STORAGE, NONVOLATILE STORAGE SYSTEM, AND MEMORY READ/WRITE METHOD

TECHNICAL FIELD

The present invention relates to a memory module, a memory controller, a nonvolatile storage, a nonvolatile storage system and a memory read/write method.

BACKGROUND ART

There is an increasing demand for nonvolatile storages having a rewritable nonvolatile main memory mainly in semiconductor memory cards. Such semiconductor memory cards include various types, and as one of them, there is a SD memory card. The SD memory card has a flash memory as a nonvolatile main memory and a memory controller for controlling the flash memory. According to instructions for reading and writing from an access device such as a digital still camera, the memory controller controls reading and writing to and from the flash memory.

Since the flash memory used as the main memory of the SD memory card has a limitation on the guaranteed number of times of rewriting such as about one hundred thousand times, a mechanism called as "wear leveling" is employed so that rewriting may not concentrate on a specific area.

The "wear leveling" is a mechanism which prevents concentration of rewriting on a specific area in the flash memory by converting logical addresses given from the access device in order to access the flash memory into physical addresses. Generally, the conversion of logical addresses into physical addresses is executed based on an address management table.

For example, a nonvolatile storage disclosed in Patent document 1 also has an address management table, and the address management table is allocated to a fixed area in a main memory formed of a flash memory.

With this configuration, wear leveling itself works well, but when a rewriting frequency of data is more than a rewriting frequency of the address management table, there has been a problem that the number of times of rewriting on an area to which the address management table is allocated exceeds the guaranteed number of times of rewriting early, thereby the life of a storage is shortened as a whole.

As a technique for solving the problem, a technique described in Patent document 2 is known. In Patent document 2, information rewritten in high frequency such as the address management table is stored in a nonvolatile auxiliary memory such as a ferroelectric memory (FeRAM) with the larger guaranteed number of times of rewriting than that of the flash memory, not in the main memory formed of the flash memory. This is due to that, as shown in Table 1, the FeRAM generally has the many larger guaranteed number of times of rewriting and a faster writing speed in small volume than those of the flash memory.

TABLE 1

| Memory type | Flash memory<br>Nonvolatile<br>(10 years) | FeRAM<br>Nonvolatile<br>(10 years) |
|---|---|---|
| Data rewriting unit | 512 to 2 kbytes | One to several bytes |
| Writing cycle | Several hundreds μs | 100 ns |
| Guaranteed number of times of rewriting | One hundred thousand times | Ten billion times |
| Overwriting | Impossible | Possible |

Here, regarding the conventional nonvolatile storage disclosed in Patent document 2, a configuration and an operation thereof will be described, and further, problems will be described, referring to FIGS. 1 to 5.

FIG. 1 is a block diagram of the nonvolatile storage in Patent document 2.

The nonvolatile storage 101 can be accessed from an access device 100 provided outside and includes a memory controller 102 and a nonvolatile main memory 103 formed of the flash memory.

The access device 100 sends commands for reading or writing of data (user data) in the main memory 103 and sends a logical address for performing reading or writing to the memory controller 102, and then, sends or receives data to or from the memory controller 102.

In response to the commands for reading or writing from the access device 100, the memory controller 102 writes data to the main memory 103 or reads data from the main memory 103. The memory controller 102 includes a host I/F part 111, a CPU 112 for controlling the whole memory controller 102, a RAM 113 as a work area of the CPU 112, a ROM 114 for storing a program executed by the CPU 112 therein, and a nonvolatile RAM 117 (nonvolatile auxiliary memory) formed of a ferroelectric memory (FeRAM). The nonvolatile RAM 117 stores a physical area management table 115 and a logical-physical conversion table 116 which are access data used in accessing the main memory 103.

The physical area management table 115 stores a status flag representing a state of a physical block as an erasure unit in the main memory 103, that is, whether or not valid data is stored.

The logical-physical conversion table 116 is a table for converting logical addresses transferred by the access device 100 into physical addresses in the main memory 103.

The memory controller 102 further includes a buffer 118 formed of a volatile RAM such as an SRAM, a read-write control part 119 for reading and writing data in the main memory 103, and an address management information control part 120 for managing addresses of the main memory 103 on the basis of the physical area management table 115 and the logical-physical conversion table 116.

The main memory 103 is composed of a lot of physical blocks. The physical block is an erasure unit, for example, consists of 32 pages as shown in FIG. 2. Each page consists of a data area (512 bytes) of 1 sector and a management area (16 bytes) as a redundant portion.

FIG. 3 shows a format of the logical address given from the access device 100 in a case where a capacity of the main memory 103 is 1 Gbyte. As shown in the figure, a page address and a logical block address are arranged in the order from a lower order bit to higher order, and 16 bits corresponding to the logical block address are the address to be converted, that is, an address in the logical-physical conversion table 116.

Since a sector size is 512 bytes and a cluster size is 16 kbytes defined by a file system of the access device 100, LSB of the cluster number corresponds to bit 5 (b5) in the logical address format.

FIG. 4 is a view showing a format of the physical area management table 115 in the case where the capacity of the main memory 103 is 1 Gbyte. An address in the physical area management table 115 corresponds to the physical block address in the main memory 103. The physical area management table 115 stores a state of each physical block in binary. That is, in the physical area management table 115, a value 00 represents a valid block in which valid data is stored, a value 11 represents an invalid block in which data is erased or unnecessary data is written, and a value 10 represents a bad block which becomes unavailable due to a solid error on a memory cell.

FIG. 5 is a view showing a format of the logical-physical conversion table 116 in the case where the capacity of the main memory 103 is 1 Gbyte. The addresses in the logical-physical conversion table 116 correspond to a logical block address (FIG. 3) of the logical address designated by the access device 100 and contents in the logical-physical conversion table 116 are physical block addresses.

Operations of the nonvolatile storage having the above-mentioned configuration will be described.

Firstly, contents in the main memory 103, physical area management table 115 and logical-physical conversion table 116 of the nonvolatile storage in an initial state, for example, immediately after shipping will be described. For simplification, description of a system area, which is allocated to the main memory 103 and stores a manufacturer code and security information therein, is omitted and only an ordinary area, that is, an area where a user reads and writes data will be described.

In the initial state, all of good blocks of the main memory 103 are erased. In other words, in the physical area management table 115, the value 11 in binary is set to a good block as an invalid block state and the value 10 in binary is set to an initial bad block as a bad block.

A value FFFF in hexadecimal is set to each address in the logical-physical conversion table 116. The value FFFF means that no physical address is set, not that the physical address in the main memory 103 is the address FFFF. Accordingly, the physical address FFFF address in the main memory 103 indicates an unavailable physical block, and a logical address space managed by the access device 100 is less than 65536 addresses from an address 0000 to an address FFFF.

After the nonvolatile storage is powered on, the CPU 112 performs initialization processing on the basis of a program stored in the ROM 114. Following the initialization processing, the nonvolatile storage is ready to accept commands for reading, writing, and the like from the access device 600.

Considered is a case where an instruction for writing to an arbitrary logical address is made in units of clusters from the access device 600.

When the instruction for writing is issued, based on the logical address, the address management information control part 120 searches invalid physical blocks in descending order from a predetermined address in the physical area management table 115 and the invalid physical block firstly found is to be a physical block to be written. Data of 1 cluster is written to the block to be written after data already existing in the block is erased.

The above-mentioned predetermined address is an address sequentially set to the address management information control part 120 by the CPU 112 so as to vary at random at each setting. Herewith, a wear leveling for preventing the block to be written from concentrating on a specific physical block is realized.

After the data is written to the main memory 103, in the physical area management table 115, a status flag of the physical block to which the data is written is set as the "valid block". In the logical-physical conversion table 116, at a position of the logical address designated according to the instruction for writing, a value of physical address corresponding to the address is written.

When a rewriting command is issued from the access device 100, in addition to the above-mentioned processing, a physical block in which old data is stored is identified based on the logical-physical conversion table 116, and the status flag in the physical area management table 115 which corresponds to the physical address of the old data is set as an invalid block.

As mentioned above, each time in writing or rewriting by the access device 100, the physical area management table 115 and the logical-physical conversion table 116 stored in the nonvolatile RAM 117 are referred and updated. Thus, the number of times of referring and updating of the nonvolatile RAM 117 is considered. Note that a capacity of the main memory 103 is assumed to be a large capacity of 4 GB.

For example, rewriting of the main memory 103 by each 1 cluster (=1 physical block) of 16 kbytes will be considered below. In this case, each time rewriting for 1 cluster is performed, the physical area management table 115 and the logical-physical conversion table 116 held in the nonvolatile RAM 117 are read multiple times and rewritten once on average. Accordingly, at a time when the main memory 103 is rewritten one hundred thousand times, in other words, at the guaranteed number of times of rewriting of the flash memory, the physical area management table 115 and others are considered to be also rewritten about one hundred thousand times.

The nonvolatile RAM 117 storing the tables 115, 116 therein is formed of FeRAM and is a memory device whose guaranteed number of times of rewriting is ten billion. Therefore, it has been considered that, even under any situation, the number of times of rewriting of the nonvolatile RAM 117 never reaches the guaranteed number of times of rewriting faster than that of the main memory 103.

Patent document 1: Japanese Unexamined Patent Publication No. 2001-142774

Patent document 2: Japanese Unexamined Patent Publication No. Hei 07-219720

DISCLOSURE OF INVENTION

Problems to be Solved by the Invention

Immediately after access data (logical-physical conversion table 116 and the like) stored in the nonvolatile RAM 117 formed of FeRAM is read, however, the access data disappears since the FeRAM is a memory device of destructive reading type. To prevent disappearance of the access data, the same access data needs to be written back to the nonvolatile RAM after reading, and, as a result, reading processing is also added to the number of times of rewriting.

Thus, as disclosed in Patent document 2, in the nonvolatile storage where the nonvolatile RAM 117 formed of the memory device of destructive reading type, it is necessary to ascertain the number of times of rewriting in consideration of the number of times of reading.

Consequently, in consideration of the number of times of reading, a device life of the nonvolatile storage in Patent document 2 is reconsidered. In a case where the whole area of the main memory 103, that is, 4 Gbytes is rewritten by 1 cluster (=1 physical block), it will be tried to calculate how many times arbitrary address in the nonvolatile RAM 117 is read. For simplification, noting the physical area management table 115 in the nonvolatile RAM 117, the number of times of referring will be described.

The physical area management table 115 is used to search the invalid block in the main memory 103 and searched in descending order from an address selected at random. A case of the fastest searching is a case where the selected address is the invalid block. A case of the slowest searching is a case where the selected address and the subsequent addresses are the valid blocks and a previous address of the selected address is an invalid block. The latter is the worst case where all addresses in the physical area management table 115 are read each time data of 1 cluster is rewritten.

Thus, assuming that the above-mentioned worst case occurs in the nonvolatile RAM 117 formed of the FeRAM, a whole area of the main memory 103, that is, 4 Gbytes is supposed to be rewritten by 1 cluster one hundred thousand times ($10^5$).

Since a capacity of the main memory 103 is 4 Gbytes and a capacity of the physical block is 16 kbytes, the number of blocks which can be specified by the physical area management table 115 is as follows:

$$4 \times 10^9 \div 16 \times 603 = 2.56 \times 10^5.$$

Thus, in the worst case, the nonvolatile RAM 117 is read about $2.56 \times 10^5$ times at each rewriting for 1 cluster. Since this reading is performed one hundred thousand times, the number of times of reading of arbitrary address in the physical area management table 115 becomes about $2.56 \times 10^{10}$, and thus exceeds a guaranteed number of times of rewriting of the FeRAM, that is, ten billion times ($10^{10}$).

In other words, the nonvolatile RAM 117 formed of the FeRAM is shorter than that of the life of the main memory 103 formed of the flash memory. Although the FeRAM with a large guaranteed number of times of rewriting is used, a problem that the life of the whole device becomes short will occur.

As a situation where the number of accesses to the nonvolatile RAM 117 (nonvolatile auxiliary memory) is larger than the number of accesses to the main memory 103, considered is a case where the nonvolatile storage serves as a music reproduction player and music is being reproduced by a player.

Music data is recorded in the main memory 103 and the music data is only read from the main memory 103 to reproduce music, while, access data in the physical area management table 115 in the nonvolatile RAM 117 needs to be referred, and destructive reading and the subsequent rewriting are performed at all times.

To solve the above-mentioned problem, in a memory module using a nonvolatile RAM of destructive read type such as FeRAM and a memory controller which has such nonvolatile RAM therein, the present invention intends to reduce destructive reading from the nonvolatile RAM and associated rewriting, thereby extending the life of the whole device as much as possible.

Means to Solve the Problems

To achieve said objects, the present invention employs following technical features.

A memory module of the present invention comprises a memory part which is formed of a nonvolatile RAM of destructive read type and a volatile RAM and stores the same data in the nonvolatile RAM and the volatile RAM; and a read-write control part for reading data from said volatile RAM in reading and for writing the same data to both said volatile RAM and said nonvolatile RAM in writing.

In addition, read-write control part may write data read from said nonvolatile RAM to said volatile RAM and may write the data to the nonvolatile RAM again as initialization processing of the memory part. Said nonvolatile RAM may be composed of a ferroelectric memory (FeRAM).

Further, a memory controller of the present invention for reading data in a nonvolatile main memory and writing data given from the outside to the main memory according to an externally given logical address comprises: a first read-write control part for reading and writing data stored in said main memory; an auxiliary memory formed of a nonvolatile RAM of destructive read type and a volatile RAM each of which stores access data used when said first read-write control part accesses said main memory; and a second read-write control part which reads and writes said access data retained in said auxiliary memory, for reading the access data from said volatile RAM in reading and for writing the same access data to both the volatile RAM and nonvolatile RAM in writing.

In addition, the second read-write control part may write the access data read from the nonvolatile RAM to the volatile RAM and may write the data to the nonvolatile RAM again as initialization processing of said auxiliary memory. Said nonvolatile RAM of destructive read type may be a ferroelectric memory (FeRAM).

Further, it is preferable that said access data includes a physical area management table for managing a state in said main memory and a logical-physical conversion table for converting a logical address into a physical address of the main memory.

According to such configurations, the second read-write control part reads access data (physical area management table and logical-physical conversion table) only from the volatile RAM, and execution of destructive reading of the nonvolatile RAM and corresponding rewriting process are not required. Accordingly, the number of rewriting the nonvolatile RAM can be prevented from reaching the guaranteed number of times of rewriting in a short time, and the life of the whole memory controller can be extended. In addition, by writing data into both of the nonvolatile RAM and the volatile RAM, contents stored in the both of them do not conflict each other.

In addition, a nonvolatile storage of the present invention comprises: a nonvolatile main memory; and a memory controller for reading data in the main memory and for writing data given from the outside to the main memory according to an externally given logical address, wherein said memory controller includes: a first read-write control part for reading and writing data stored in said main memory; an auxiliary memory formed of a nonvolatile RAM of destructive read type and a volatile RAM which each store access data used when said first read-write control part accesses said main memory; and a second read-write control part which reads and writes access data retained in said auxiliary memory, for reading the access data from the volatile RAM in reading and for writing the same access data to both said volatile RAM and nonvolatile RAM in writing.

In addition, said second read-write control part writes the access data read from said nonvolatile RAM to said volatile RAM and writes the data to the nonvolatile RAM again as initialization processing of said auxiliary memory. Said nonvolatile RAM of destructive read type may be a ferroelectric memory (FeRAM).

Further, it is preferable that said access data includes a physical area management table for managing a state in said main memory and a logical-physical conversion table for converting a logical address into a physical address of said main memory.

According to such configurations, the second read-write control part reads access data (physical area management table and logical-physical conversion table) only from the volatile RAM, and execution of destructive reading of the nonvolatile RAM and corresponding rewriting process are not required. Accordingly, the number of rewriting the nonvolatile RAM can be prevented from reaching the guaranteed number of times of rewriting in a short time, and the life of the whole nonvolatile storage can be extended. In addition, by writing data into both of the nonvolatile RAM and the volatile RAM, contents stored in the both of them do not conflict each other.

In addition, a nonvolatile storage system of the present invention comprises: a nonvolatile storage including a nonvolatile main memory and a memory controller for reading data in said main memory and for writing data given from the outside to said main memory according to an externally given logical address; and an access device for giving a logical address and data to said nonvolatile storage, wherein said memory controller includes: a first read-write control part for reading and writing data stored in said main memory; an auxiliary memory formed of a nonvolatile RAM of destructive read type and a volatile RAM which each store access data used when said first read-write control part accesses said main memory; and a second read-write control part which reads and writes the access data retained in said auxiliary memory, for reading the access data from the volatile RAM in reading and for writing the same access data to both the volatile RAM and nonvolatile RAM in writing.

In addition, said second read-write control part may write the access data read from the nonvolatile RAM to the volatile RAM and may write the access data to the nonvolatile RAM again as initialization processing of said auxiliary memory. Said nonvolatile RAM of destructive read type may be a ferroelectric memory (FeRAM).

Further, it is preferable that said access data includes a physical area management table for managing a state in said main memory and a logical-physical conversion table for converting a logical address into a physical address of said main memory.

With this configuration, a second read-write control part reads access data (the physical area management table and the logical-physical conversion table) only from the volatile RAM and thus, destructive reading of the nonvolatile RAM and the attendant data rewriting processing do not need to be performed. Therefore, it is possible to prevent the number of times of rewriting of the nonvolatile RAM from reaching the guaranteed number of times of rewriting in a short time and extend the life of the whole nonvolatile storage system. By writing data to both the nonvolatile RAM and volatile RAM, inconsistency between contents stored in the both RAMs never occurs.

The memory read/write method according to the present invention is characterized in that when accessing a memory part which is formed of the nonvolatile RAM of destructive read type and a volatile RAM and stores the same data in the nonvolatile RAM and the volatile RAM, data is read from the volatile RAM in data reading and data is written to both the volatile RAM and nonvolatile RAM in data writing.

As initializing processing of the memory part, the data read from the nonvolatile RAM may be written to the volatile RAM and the data is written to the nonvolatile RAM again.

Effectiveness of the Invention

In memory modules, and memory controllers, nonvolatile storages, and nonvolatile storage systems which have the memory module therein according to the present invention, destructive reading of the nonvolatile RAM and the number of times of attendant rewriting can be reduced since data is read from only the volatile RAM. Therefore, it is possible to prevent the number of times of rewriting of the nonvolatile RAM from reaching the guaranteed number of times of rewriting in a short time and extend the life of the whole device.

BRIEF DESCRIPTION OF DRAWINGS

FIG. 2 is a view showing a physical block of a main memory.

REFERENCE NUMERALS

Figure 1:
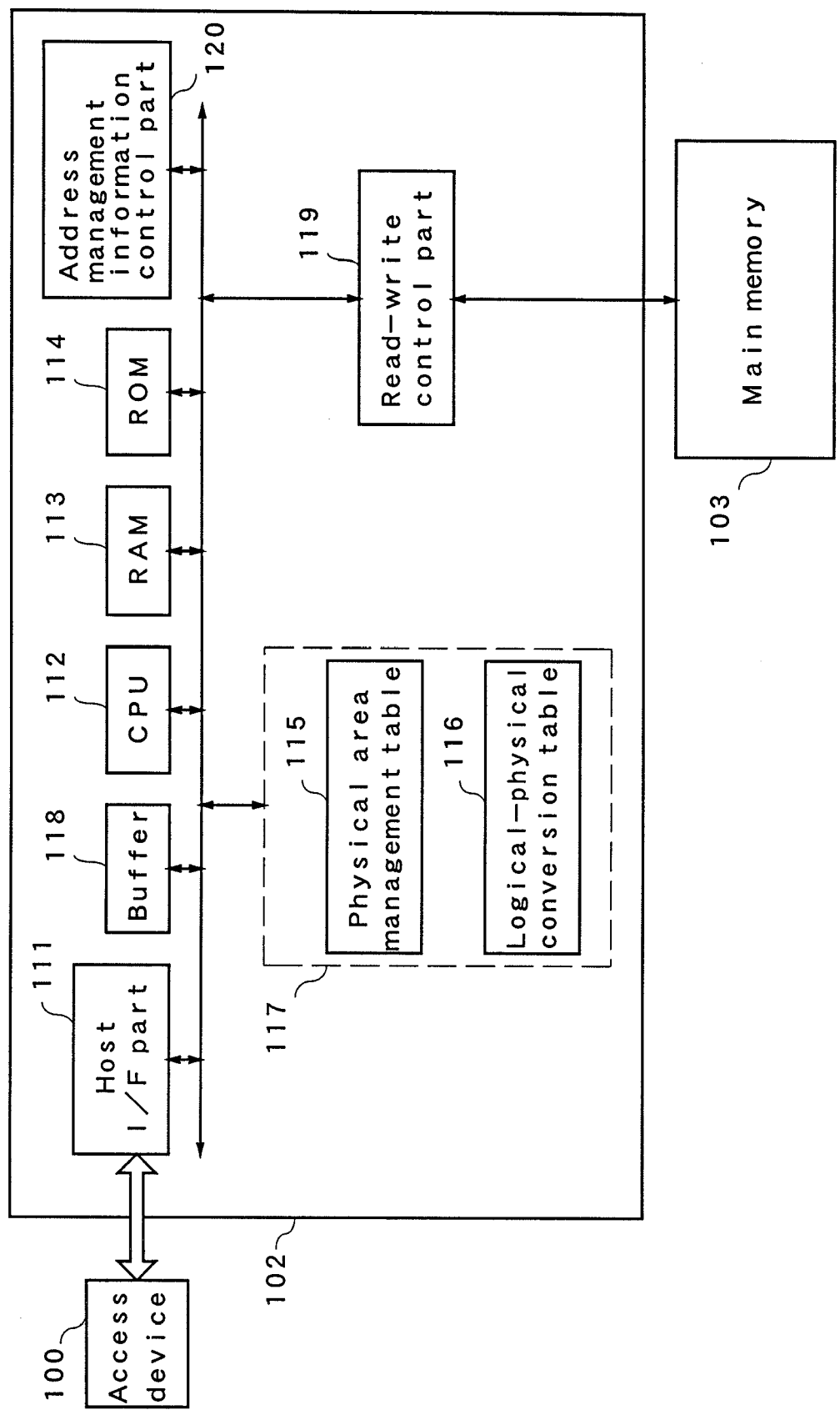
FIG. 1 is a block diagram of a conventional nonvolatile storage.
Figure 3:
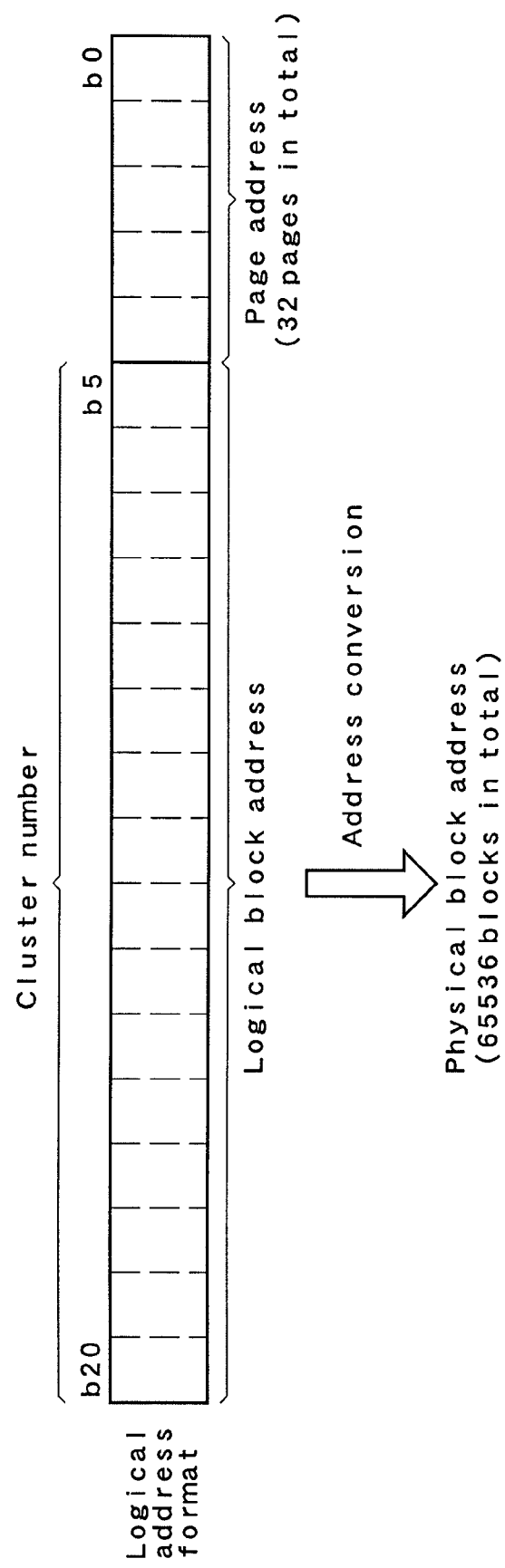
FIG. 3 is a view showing a logical address format.

100 Access device
102 Memory controller
103 Main memory
112 CPU
115 Physical area management table
116 Logical-physical conversion table
117 Nonvolatile RAM
118 Buffer
119 First read-write control part
120 Address management information control part
600 Volatile RAM
601 Second read-write control part
602 Auxiliary memory
604 Physical area management table
605 Logical-physical conversion table
606 Memory module

BEST MODE FOR CARRYING OUT THE INVENTION

The present invention will be described below using a nonvolatile storage such as an SD memory card as an example.

Figure 6:
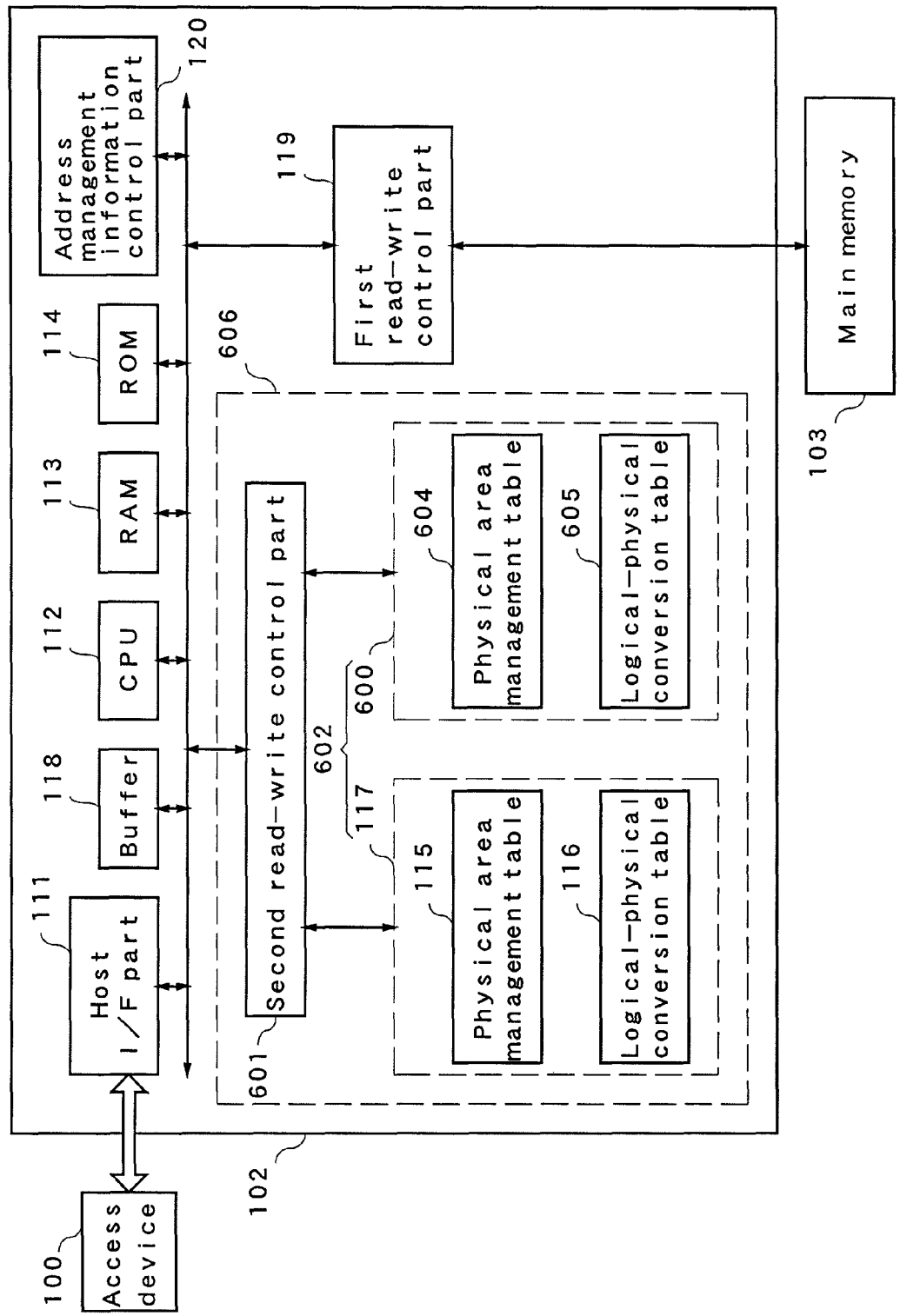
FIG. 6 is a block diagram of a nonvolatile storage according to the present invention.

As shown in FIG. 6, the nonvolatile storage in the present embodiment includes a memory controller 102 and a nonvolatile main memory 103 formed of a flash memory, and can be accessed from an external access device 100. This state corresponds to, for example, a case where the SD card memory is inserted into a digital still camera (access device) so as to record image data in the card memory. In FIG. 6, the same reference numerals are given to the same components as those in a conventional nonvolatile storage (FIG. 1).

In the memory controller 102, a volatile RAM 600 formed of an SRAM and a second read-write control part 601 are newly added to a memory controller of the conventional nonvolatile storage. Furthermore, as conventional, the memory controller 102 includes the nonvolatile RAM 117 formed of the FeRAM. The nonvolatile RAM 117 and the volatile RAM 600 have a substantially same capacity and store identical access data therein.

Figure 4:
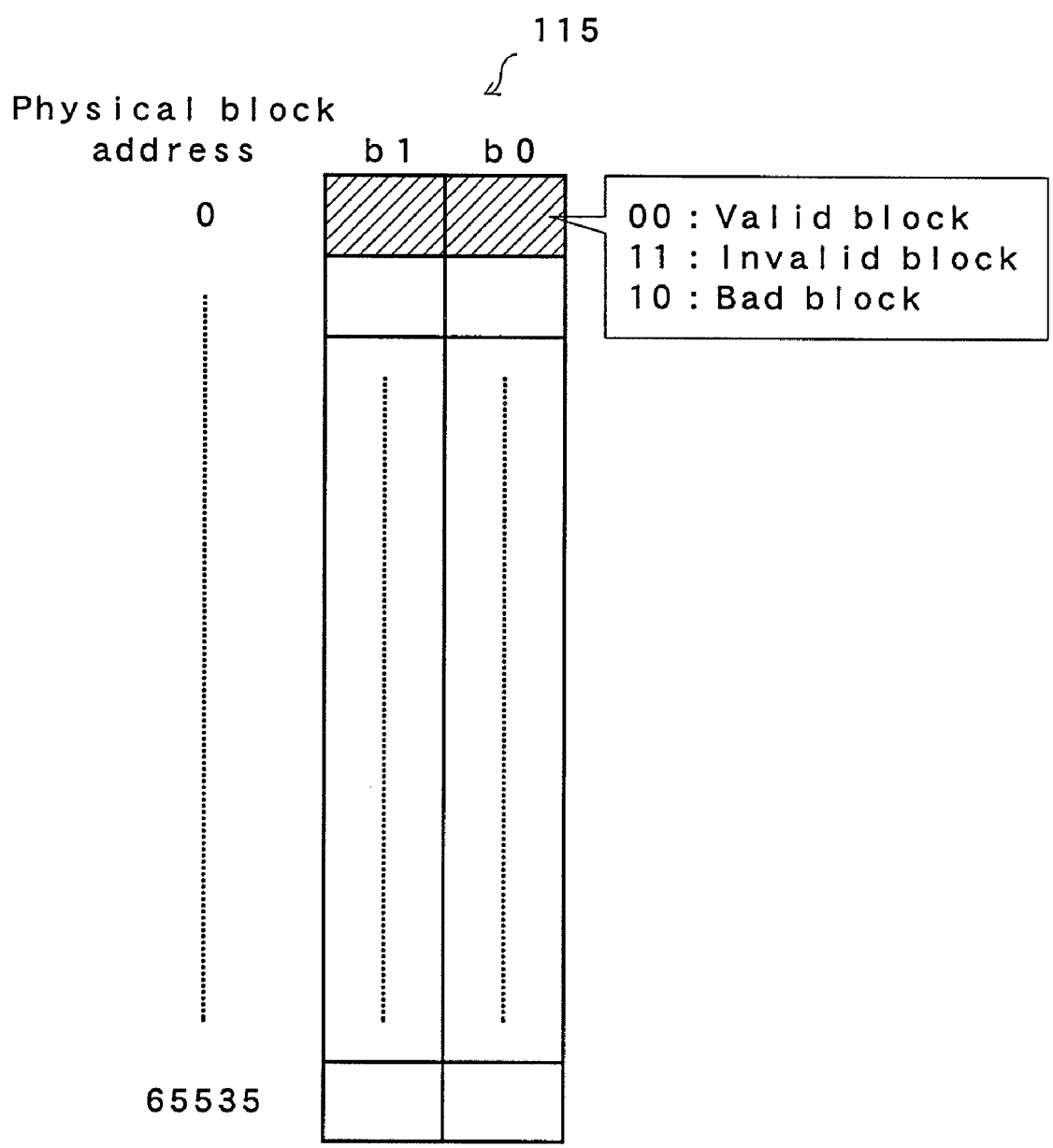
FIG. 4 is a view showing a physical management area table.
Figure 5:
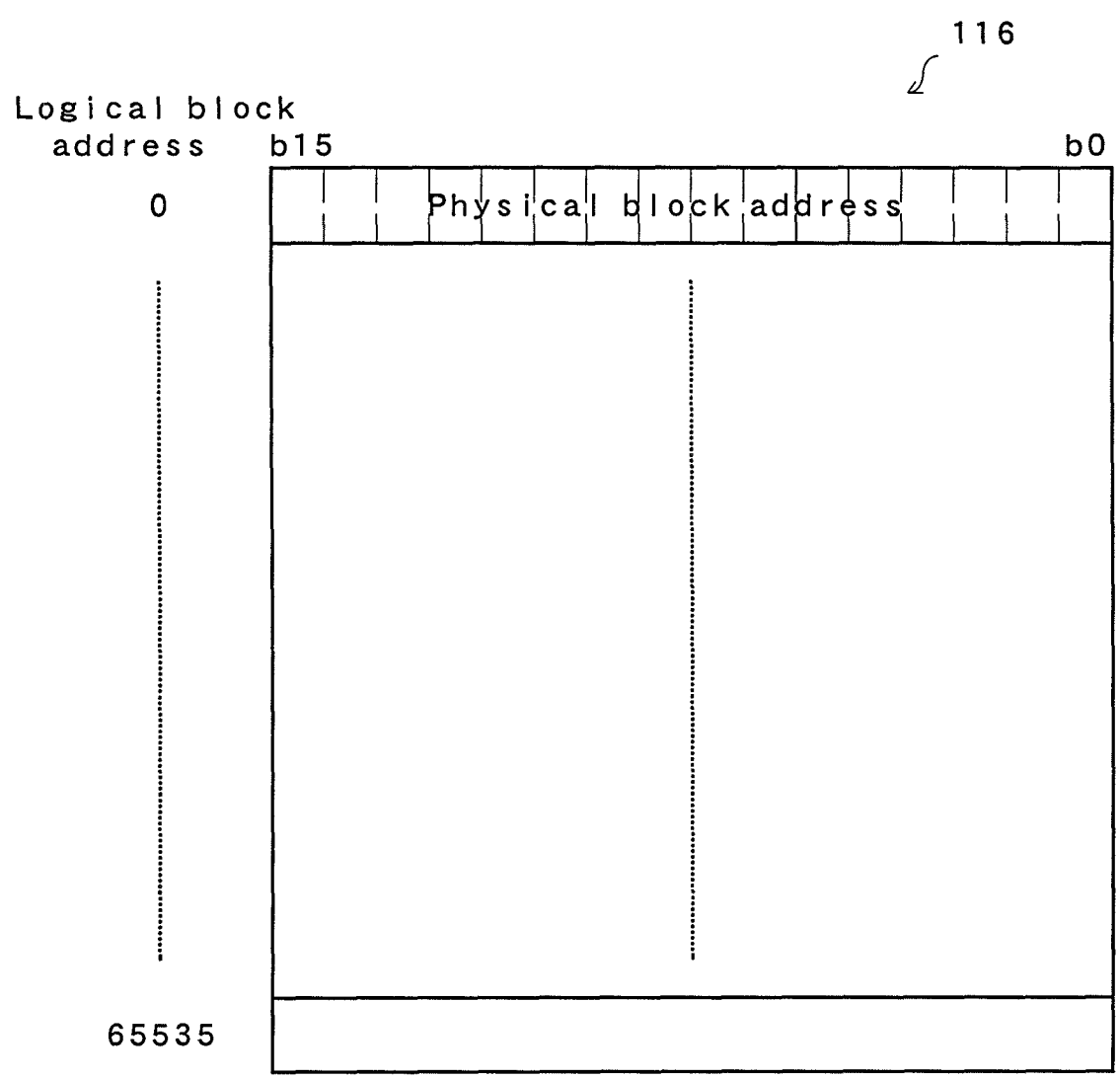
FIG. 5 is a view showing a logical-physical conversion table.

The access data described herein refers to a physical area management table and a logical-physical conversion table which are used when the first read-write control part 119 (hereinafter also referred to as merely a first control section)

accesses the main memory 103. Formats of both the tables are the same as formats used in the conventional nonvolatile storage (FIGS. 4 and 5).

The volatile RAM 600 and the nonvolatile RAM 117 are collectively referred to as an auxiliary memory 602 (memory part). The guaranteed number of times of rewriting of the FeRAM constituting the nonvolatile RAM 117 is about $10^{10}$ and the guaranteed number of times of rewriting of the SRAM constituting the volatile RAM 600 is about $10^{15}$.

A second read-write control part 601 (hereinafter also referred to as merely a second control part) accesses an auxiliary memory 602, and reads and writes access data stored in the memory. The second read-write control part 601 and the auxiliary memory 602 form a memory module. Other components are similar to those in the conventional nonvolatile storage.

According to the present invention, in such nonvolatile auxiliary storage, when the second read-write control part 601 accesses the auxiliary memory 602, the second read-write control part 601 reads data from the volatile RAM 600 (nonvolatile auxiliary memory) at reading and writes data to both the volatile RAM 600 and nonvolatile RAM 117 (nonvolatile auxiliary memory) at writing.

Operations of the nonvolatile storage with the above-mentioned configuration will be described in detail with reference to figures.

Figure 7A:
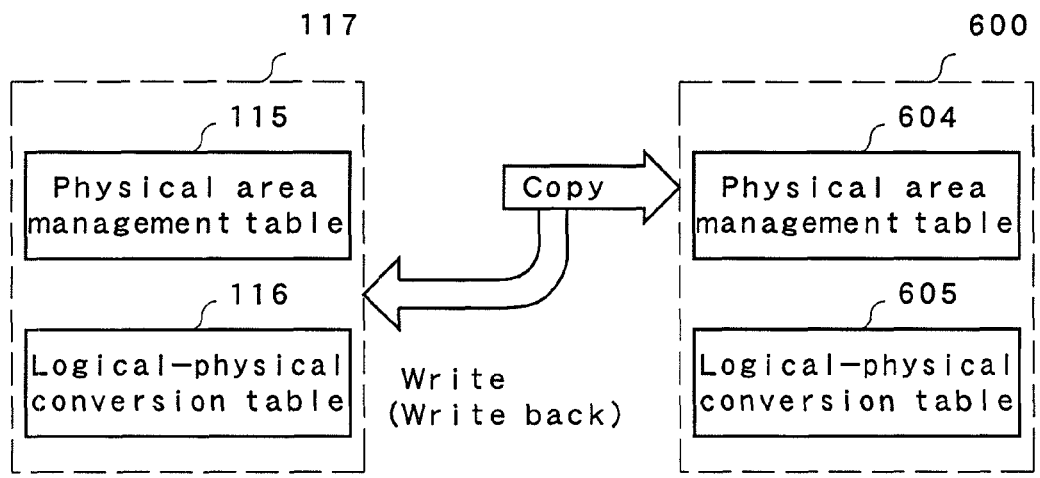
FIG. 7A shows an access mode to an auxiliary memory at initialization.
Figure 7B:
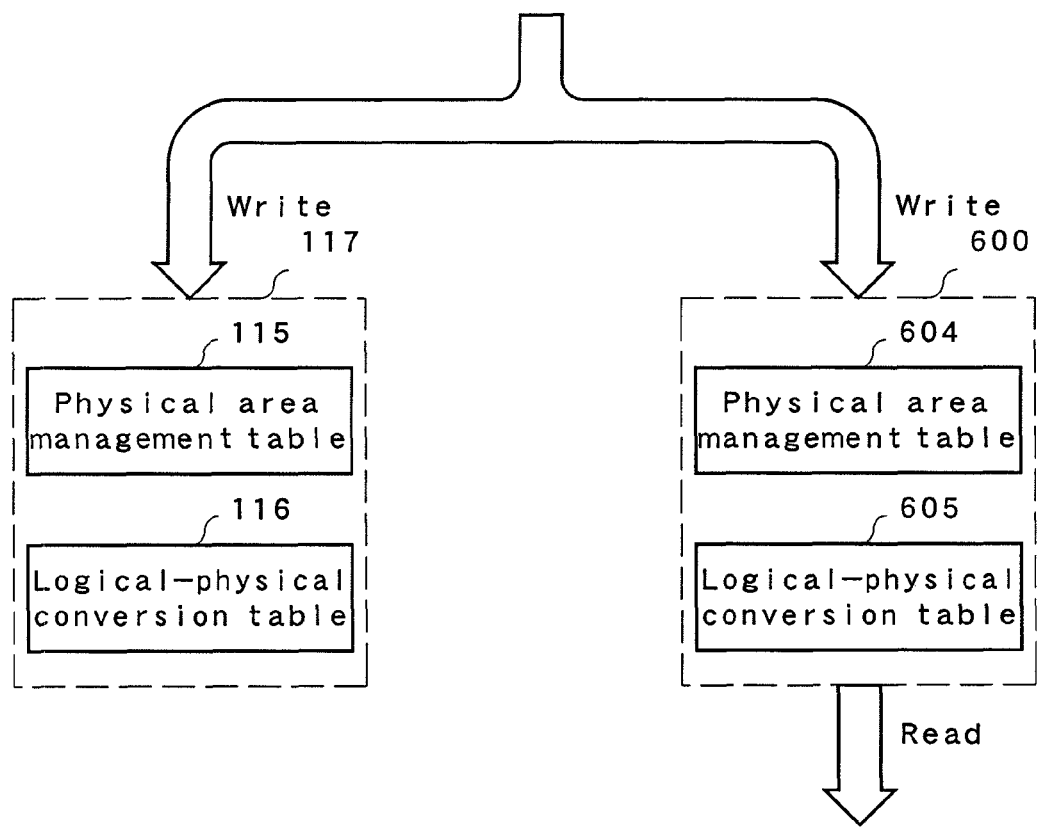
FIG. 7B shows an access mode to the auxiliary memory at a normal operation.
Figure 8:
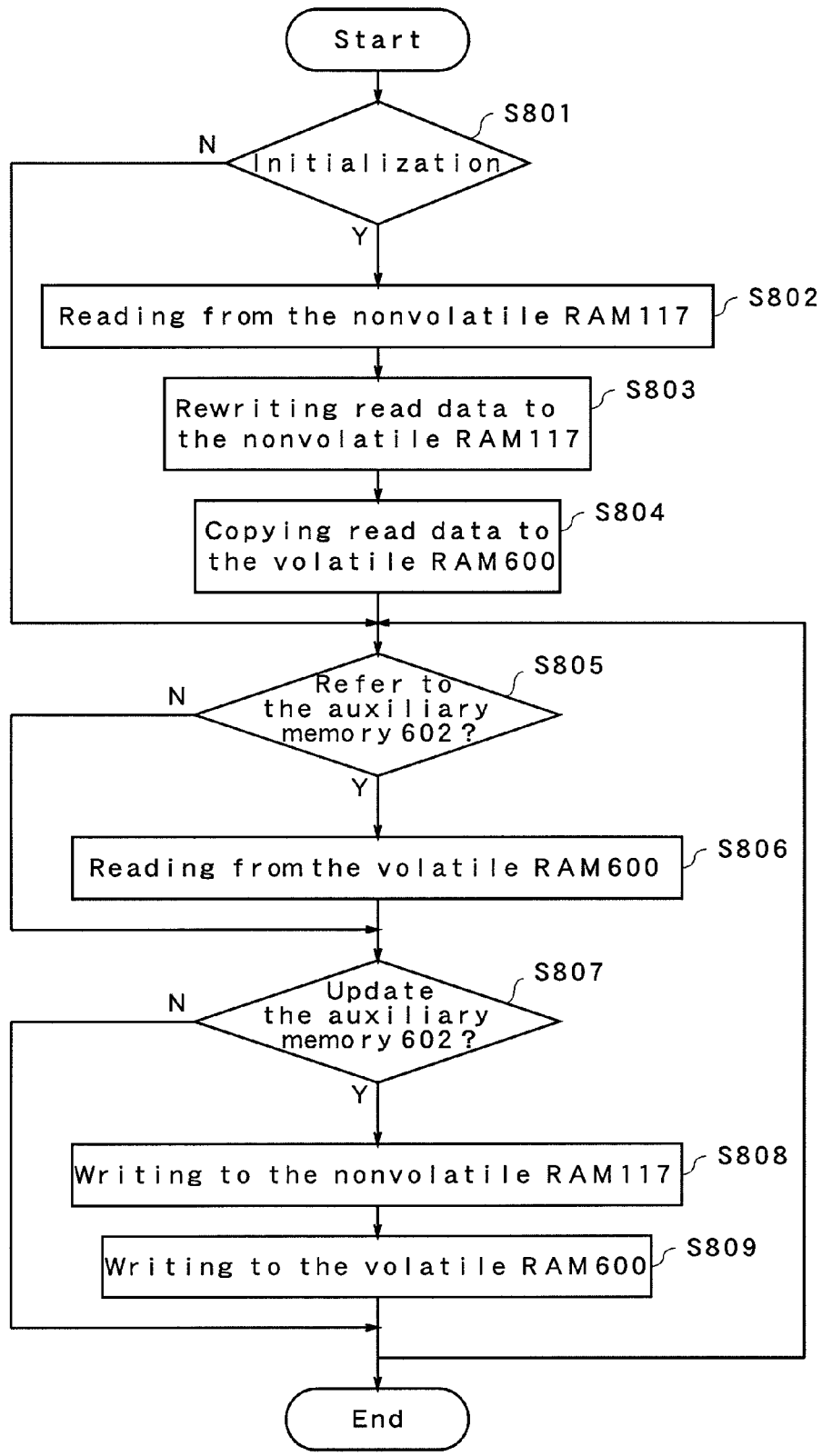
FIG. 8 is a flowchart showing reading-writing processing to a read-write control part.

FIG. 7A shows an access mode accessing the auxiliary memory 602 at initialization of the memory controller 102. FIG. 7B shows an access mode to the auxiliary memory 602 at a normal operation. FIG. 8 is a flowchart showing reading-writing processing.

Since the basic operation of the nonvolatile storage in the present embodiment is the substantially same as the operation of the conventional nonvolatile storage shown in FIG. 1, only the different points will be explained.

[Initialization Processing]

After power-on, the CPU 112 performs initialization processing on the basis of a program stored in the ROM 114. After the initialization processing by the CPU 112 is finished, control proceeds to the address management information control part 120 and the address management information control part 120 sends an instruction for initializing the auxiliary memory 602 to the second read-write control part 601.

The second read-write control part 601, which receives the initialization instruction, reads access data such as a status flag stored in the physical area management table 115 and a physical address stored in the logical-physical conversion table 116 from the nonvolatile RAM 117 (S801, S802).

At this time, since the access data disappears after reading because the nonvolatile RAM 117 is a memory device of destructive read type, the access data is written back to the nonvolatile RAM 117 (S803).

In addition, the read access data is copied also to the volatile RAM 600 (S804). Specifically, the physical area management table 115 is copied to the physical area management table 604 and the logical-physical conversion table 116 is copied to the logical-physical conversion table 605. FIG. 7A shows the above-mentioned processing, schematically.

[Normal Operation Processing]

When the initialization processing is finished, the second read-write control part 601 informs the CPU 112 of the completion of the initialization processing, and the CPU 112 switches various controls in the memory controller 102 into a normal operation mode. The access device 100 also recognizes a switching of the memory controller 102 to the normal operation mode and turns into the normal operation mode.

During the normal operation, when the access device 100 sends a write command or a read command to the memory controller 102, the CPU 112 recognizes a type of the command and transfers an instruction corresponding to each command to the second read-write control part 601 through the address management information control part 120. In a case of a write command, the access device transfers data and the memory controller 600 retains the data in the buffer 118.

[In Writing]

Firstly, data writing processing of recording data to the physical block of the main memory 103 first will be described.

The CPU 112 issues a write command to the second read-write control part 601 through the address management information control part 120. Then, the second read-write control part 601 recognizes necessity of referring of the auxiliary memory 602 (S805) and reads access data from the volatile RAM 600, not from the nonvolatile RAM 117 (S806).

In the reading processing at S806, based on a logical address Z transferred from the access device 100, a corresponding physical address is read from the logical-physical conversion table 605. When the physical address is an address FFFF in hexadecimal, it is recognized that no physical address is set as in the conventional nonvolatile storage, which means the writing processing.

Furthermore, the second read-write control part 601 searches an invalid block from the physical area management table 604 in the volatile RAM 600 and determines a physical block to be written, that is, the physical address X.

Next, due to data writing processing, the auxiliary memory needs to be updated. Thus, followed by S807, the second read-write control part 601 writes access data updated with information of the physical address X to both the nonvolatile RAM 117 and the volatile RAM 600 (S808, S809).

More specifically, the logical-physical conversion table where the logical address Z newly corresponds to the physical address X is written to the logical-physical conversion tables 116 and 605 of the nonvolatile RAM 117 and the volatile RAM 600, respectively. Similarly, a status flag of the address corresponding to the physical address X is made valid and is written to the physical area management tables 115 and 604 of both the nonvolatile RAM 117 and volatile RAM 600, respectively.

Then, the second read-write control part 601 transfers the physical address X to the first read-write control part 119 through the address management information control part 120. The first read-write control part 119 writes data retained in the buffer 118 to a physical block of the main memory 103 at the physical address X.

Arrows represented by write in FIG. 7B schematically show the above-mentioned processing.

[Normal Operation Processing . . . In Rewriting]

Firstly, data rewriting processing will be described. The rewriting processing is processing for recording new data in place of old data in a physical block of the main memory 103. This processing is the substantially same as the above-mentioned data writing processing and is not different processing. Only a difference is that the old data needs to be invalidated.

That is, in the reading processing at S806, the second read-write control part 601 refers to the logical-physical conversion table 605 in the volatile RAM 600 and reads a physical address corresponding to the logical address Z transferred from the access device 100. At this moment, since the processing is the rewriting processing, the read physical address is an address other than the address FFFF in hexadecimal (for example, physical address Y) and the old data is written at the physical address Y.

At the same time, the second read-write control part 601 searches an invalid block from the physical area management table 604 in the volatile RAM 600 and determines an invalid block to be written (physical address X).

Next, due to the writing processing (Yes at S807), the second read-write control part 601 writes access data updated with information of the physical address X to both the nonvolatile RAM 117 and the volatile RAM 600 (S808, S809).

More specifically, the logical-physical conversion table where the logical address Z newly corresponds to the physical address X is written to the logical-physical conversion tables 116 and 605 of the nonvolatile RAM 117 and the volatile RAM 600, respectively. In addition, a status flag of the physical address Y is set to an invalid state. That is, a status flag of the physical address X being valid, and the status flag of the physical address Y being invalid are written to the physical area management tables 115 and 604 of the nonvolatile RAM 117 and the volatile RAM 600, respectively.

Then, the second read-write control part 601 transfers the physical address X to the first read-write control part 119 through the address management information control part 120. The first read-write control part 119 writes data retained in the buffer 118 to a physical block of the main memory 103 at the physical address X.

Arrows represented by write in FIG. 7B schematically show the above-mentioned processing.

[Normal Operation Processing . . . In Reading]

Next, a case where the access device 100 transfers a read command will be described.

The CPU 112 instructs "reference to the logical-physical conversion table 605" to the second read-write control part 601 through the address management information control part 120. That is, the CPU informs that the logical address Z transferred by the access device 100 needs to be converted into the physical address X.

At this moment, since the second read-write control part 601 needs to refer to the auxiliary memory 602, step S805 proceeds to S806 and the logical-physical conversion table 605 is read from the volatile RAM 600 without reading the nonvolatile RAM 117. An arrow represented by read in FIG. 7B schematically shows the above-mentioned processing.

The read physical address X is transferred to the address management information control part 120, and, by using the physical address X, the first read-write control part 119 can read data stored at the physical address X of the main memory 103. The read data is transferred to the access device 100 via the buffer 118 and the host I/F section 111.

[Guaranteed Number of Times of Rewriting]

In summary of the above-mentioned nonvolatile storage in the present embodiment, a configuration thereof corresponds to the following two points.

(i) The volatile RAM 600 corresponding to the nonvolatile RAM 117 of destructive read type is provided and the auxiliary memory 602 is formed by both the RAMs.

(ii) The second read-write control part 601 for reading and writing data in the auxiliary memory 602 is provided. The second read-write control part 601 has the following characteristics.

A) Initialization Processing

Data is read from the nonvolatile RAM 117 and all area is copied to the volatile RAM 600. When the data is read from the nonvolatile RAM 117, the writing back processing is performed due to destructive read.

B) Normal Operation Processing

In reading, data is read from the volatile RAM. At writing, data is written to both the nonvolatile RAM and the volatile RAM.

Therefore, in normal reading, since reading from the nonvolatile RAM 117 of destructive read type is unnecessary, the writing back processing to the nonvolatile RAM 117 becomes unnecessary, and, as a result, the number of times of rewriting of the nonvolatile RAM 117 can be reduced as compared with that of the conventional nonvolatile storage shown in FIG. 1.

Especially as far as the initialization processing is not performed, that is, the power is not repeatedly turned on and off, the auxiliary memory 602 is the substantially same as a memory constituted by using "memory device of non-destructive read type" and thus, rewriting due to data reading becomes unnecessary. Therefore, even when all area of the nonvolatile main memory 103 (4 Gbytes) is rewritten by 1 cluster one hundred thousand times, the auxiliary memory 602 is also rewritten only about one hundred thousand times.

Meanwhile, in the initialization processing, each address of the nonvolatile RAM 117 is read through and accordingly, the rewriting processing is performed. Therefore, focusing on only the initialization processing, the number of times of rewriting of the nonvolatile RAM 117 is equal to the number of times of initialization, that is, the number of times the power is turned on and off.

In summary, in the nonvolatile storage in the present embodiment, when the main memory 103 is rewritten one hundred thousand times, the number of times of rewriting of the nonvolatile RAM 117 becomes "one hundred thousand times+the number of times the power is turned on and off" when the initialization and normal operation are summed up.

The number of times of rewriting of the nonvolatile auxiliary memory 117=One hundred thousand times+the number of times the power is turned on and off<<Ten billion times.

The number of times of turning on and off the power depends on how to use the nonvolatile storage. However, judging from a normal product usage and product life, the number of times must be much smaller than ten billion times. Therefore, the number of times of turning on and off the power must be a problem-free value in terms of the life of the nonvolatile storage and is much smaller than ten billion times as the guaranteed number of times of rewriting of the FeRAM.

In the above, although the nonvolatile storage including the memory controller and the nonvolatile main memory has been described as an example, the present invention is not limited to this.

The present invention also applies to the memory module 606 reflecting a technical concept that "a volatile RAM corresponding to the nonvolatile RAM of destructive read type is provided, data is read from only the volatile RAM in reading and data is written to both the nonvolatile RAM and volatile RAM in writing". The present invention also applies to a single piece of the memory controller incorporating the memory module therein. A nonvolatile storage system formed by integrating the nonvolatile storage with the access device falls within a technical scope of the present invention.

INDUSTRIAL APPLICABILITY

The nonvolatile storage according to the present invention is a device providing a technique for realizing a life extension of the whole device in a device using a nonvolatile memory such as a flash memory as a main memory and a nonvolatile RAM of destructive read type as an auxiliary memory, and the nonvolatile storage is useful as a recording medium for portable AV appliances such as still image recording and reproducing devices and video recording and reproducing devices or portable communication devices such as mobile phones.

The invention claimed is:

1. A memory controller for reading data from a nonvolatile main memory and writing data received from outside to the main memory according to an externally given logical address, said memory controller comprising:
   a CPU that controls the entire memory controller;
   a first volatile RAM that operates as a work area of the CPU;
   a first read-write controller that reads and writes data from and to the main memory;
   an auxiliary memory comprising a nonvolatile RAM of destructive read type and a second volatile RAM separate from the first volatile RAM, each of the nonvolatile RAM and the second volatile RAM storing access data used when the first read-write controller accesses the main memory; and
   a second read-write controller that reads and writes the access data from and to the auxiliary memory according to a command to access the auxiliary memory from the CPU, the second read-write controller reading access data from the second volatile RAM in reading from the auxiliary memory, the second read-write controller writing the same access data to both the second volatile RAM and the nonvolatile RAM in writing to the auxiliary memory, such that the same access data that is written into the second volatile RAM is written into the nonvolatile RAM every time the access data is written into the second volatile RAM, to maintain consistency in the access data between the nonvolatile RAM and the second volatile RAM,
   wherein the second read-write controller reads access data from the nonvolatile RAM, and writes the access data read from the nonvolatile RAM to the second volatile RAM and writes back the access data to the nonvolatile RAM during initialization processing of the auxiliary memory,
   the access data includes a physical area management table for managing a state in the main memory and a logical-physical conversion table for converting a logical address into a physical address of the main memory, and
   wherein the second read-write controller reads the access data from the nonvolatile RAM only at the initialization processing of the auxiliary memory.

2. The memory controller according to claim 1, wherein the nonvolatile RAM of destructive read type comprises a ferroelectric memory (FeRAM).

3. The nonvolatile memory controller according to claim 1, wherein, in writing to the auxiliary memory, the second read-write controller writes the same access data that is written into the second volatile RAM into the nonvolatile RAM substantially simultaneously with the writing into the second volatile RAM.

4. The memory controller according to claim 1, wherein the nonvolatile RAM and the second volatile RAM have substantially a same capacity.

5. The memory controller according to claim 1, wherein the nonvolatile RAM, the second volatile RAM and the second read-write controller form a memory module.

6. The memory controller according to claim 1, wherein the command from the CPU to the second read-write controller indicates writing data to the main memory,
   upon receiving the command from the CPU, the second read-write controller determines that reading from the auxiliary memory is necessary,
   upon determining that reading from the auxiliary memory is necessary, the second read-write controller reads the access data from the second volatile RAM,
   after reading the access data from the second volatile memory, the second read-write controller further determines, based on the command from the CPU, that writing to the auxiliary memory is necessary,
   upon determining that writing to the auxiliary memory is necessary, the second read-write controller writes the same access data into both the second volatile RAM and the nonvolatile RAM, and
   the first read-write controller writes data to the main memory based on the access data written into both the second volatile RAM and the nonvolatile RAM.

7. The memory controller according to claim 1, wherein the command from the CPU to the second read-write controller indicates reading access data from the auxiliary memory,
   upon receiving the command from the CPU, the second read-write controller determines that reading from the auxiliary memory is necessary,
   upon determining that reading from the auxiliary memory is necessary, the second read-write controller reads the access data from the second volatile RAM, without accessing the nonvolatile RAM, and
   the first read-write controller reads data from the main memory based on the access data read from the second volatile RAM.

8. The memory controller according to claim 1, further comprising an address management information controller, through which the command is sent from the CPU to the second read-write controller.

9. A nonvolatile storage comprising:
   a nonvolatile main memory; and
   a memory controller that reads data from the main memory and writes data received from outside to the main memory according to an externally given logical address, wherein
   the memory controller includes:
   a CPU that controls the entire memory controller;
   a first volatile RAM that operates as a work area of the CPU;
   a first read-write controller that reads and writes data from and to the main memory;
   an auxiliary memory comprising a nonvolatile RAM of destructive read type and a second volatile RAM separate from the first volatile RAM, each of the nonvolatile RAM and the second volatile RAM storing access data used when the first read-write controller accesses the main memory; and
   a second read-write controller that reads and writes access data from and to the auxiliary memory according to a command to access the auxiliary memory from the CPU, the second read-write controller reading access data from the second volatile RAM in reading from the auxiliary memory, the second read-write controller writing the same access data to both the second volatile RAM and the nonvolatile RAM in writing to the auxiliary memory, such that the same access data that is written into the second volatile RAM is written into the nonvolatile RAM every time the access data is written into the second volatile RAM, to maintain consistency in the access data between the nonvolatile RAM and the second volatile RAM,
   wherein the second read-write controller reads access data from the nonvolatile RAM, and writes the access data read from the nonvolatile RAM to the second volatile RAM and writes back the access data to the nonvolatile RAM during initialization processing of the auxiliary memory, wherein the access data includes a physical area management table for managing a state in the main memory and a logical-physical conversion table for converting a logical address into a physical address of the main memory, and wherein the second read-write controller reads the access data from the nonvolatile RAM only at the initialization processing of the auxiliary memory.

10. The nonvolatile storage according to claim 9, wherein the nonvolatile RAM of destructive read type comprises a ferroelectric memory (FeRAM).

11. The nonvolatile storage according to claim 9, wherein, in writing to the auxiliary memory, the second read-write controller writes the same access data that is written into the second volatile RAM into the nonvolatile RAM substantially simultaneously with the writing into the second volatile RAM.

12. A nonvolatile storage system comprising:
a nonvolatile storage comprising:
    a nonvolatile main memory; and
    a memory controller that reads data from the main memory and writes data received from outside to the main memory according to an externally given logical address; and
an access device that provides a logical address and data to the nonvolatile storage,
wherein the memory controller comprises:
a CPU that controls the entire memory controller;
a first volatile RAM that operates as a work area of the CPU;
a first read-write controller for reading and writing data stored in the main memory;
an auxiliary memory comprising a nonvolatile RAM of destructive read type and a second volatile RAM separate from the first volatile RAM, each of the nonvolatile RAM and the second volatile RAM storing access data used when the first read-write controller accesses the main memory; and
a second read-write controller that reads and writes the access data from and to the auxiliary memory according to a command to access the auxiliary memory from the CPU, the second read-write controller reading access data from the second volatile RAM in reading from the auxiliary memory, the second read-write controller writing the same access data to both the second volatile RAM and the nonvolatile RAM in writing to the auxiliary memory, such that the same access data that is written into the second volatile RAM is written into the nonvolatile RAM every time the access data is written into the second volatile RAM, to maintain consistency in the access data between the nonvolatile RAM and the second volatile RAM, wherein the second read-write controller reads access data from the nonvolatile RAM and writes the access data read from the nonvolatile RAM to the second volatile RAM and writes back the access data to the nonvolatile RAM during initialization processing of the auxiliary memory, and wherein the access data includes a physical area management table for managing a state in the main memory and a logical-physical conversion table for converting a logical address into a physical address of the main memory, and wherein the second read-write controller reads the access data from the nonvolatile RAM only at the initialization processing of the auxiliary memory.

13. The nonvolatile storage system according to claim 12, wherein the nonvolatile RAM comprises a ferroelectric memory (FeRAM).

14. The nonvolatile storage system according to claim 12, wherein, in writing to the auxiliary memory, the second read controller write writes the same access data that is written into the second volatile RAM into the nonvolatile RAM substantially simultaneously with the writing into the second volatile RAM.

\* \* \* \* \*